Nov. 13, 1956 MIKOLAJ V. CZYZEWSKI NOW BY JUDICIAL CHANGE OF NAME MAC VICTOR CHELTON 2,770,786

DOUBLE SAFETY ELECTRICAL RECEPTACLE

Filed Oct. 11, 1952 2 Sheets-Sheet 1

INVENTOR
MIKOLAJ V. CZYZEWSKI, BY JUDICIAL CHANGE OF NAME MAC VICTOR CHELTON
BY G. Wright Arnold
ATTORNEY INVENTOR
MIKOLAJ V. CZYZEWSKI BY JUDICIAL CHANGE OF NAME, MAC VICTOR CHELTON.
BY
G. Wright Arnold
ATTORNEY United States Patent Office 2,770,786

Patented Nov. 13, 1956

2,770,786

DOUBLE SAFETY ELECTRICAL RECEPTACLE

Mikolaj V. Czyzewski, Seattle, Wash., now by judicial change of name Mac Victor Chelton Application October 11, 1952, Serial No. 314,383

10 Claims. (Cl. 339—40)

My invention relates to a double safety electrical receptacle.

More particularly, my invention relates to an electrical safety receptacle or convenience outlet which will prevent children from becoming shocked by inserting metallic objects into the outlet.

So much difficulty has been had with children inserting metallic objects into electrical convenience outlets or receptacles, particularly those located near the floor, that it has become a matter of recognized danger. Suggestions have been made to provide a safeguard for such electrical convenience outlets but they are of a character which involves unusual mode of operation when the adult desires to insert the plug. Some of these so called safety receptacles are of such a complex character that after the children have grown up it is suggested that they be changed. Of course this is not practical because guests arriving with their children should likewise be protected.

These suggested devices not only fail in protecting against insertion of foreign objects, such as bobby pins or nails, but they fail in protecting against danger by insertion of the regular plug by the infant who has been known to get its finger on the prong-side of the plug and thereby received a shock by reason of the fact that the prongs were inserted just short of their full length due to the thickness of the infant's finger but far enough to energize the prongs which contact the finger.

A primary object of my invention is to provide an electrical safety outlet which will overcome all of the above objections and particularly, my invention is one which involves no difference in operation in inserting the plug than is employed in the common unguarded safety receptacle and therefore one that once is installed may be left in operation so long as desired, even for the life of the building. That is, without regard to whether or not children are about. My invention protects against the insertion of foreign metallic objects, such as nails, hair pins or the like, as well as against insertion of the regular plug, that is, by an infant with its finger disposed between or beside and in contact with the prongs at rear of the plug. It being a primary object of my invention to safeguard not only against metallic objects unintended to be used in the receptacle but also to guard against the insertion by the infant of the plug in a manner which would result in an electrical shock to the infant.

Furthermore, it is an object of my invention to provide a safety electrical receptacle of a character which permits the application of the regular electrical plug in the regular manner in the commonly used unguarded receptacle.

The foregoing mentioned general objects of this invention are attained by the device illustrated in the accompanying drawings, throughout which drawings like reference numerals indicate like parts:

Figure 8:
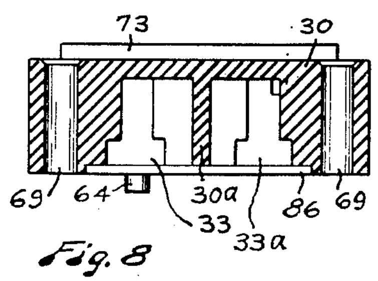
Fig. 8 is a view in horizontal section of the rear or back housing member of this receptacle.
Figure 6A:
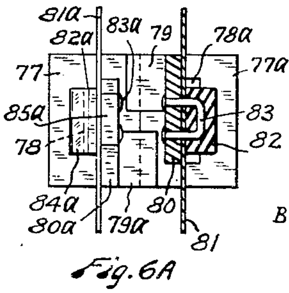
Fig. 6A is a detached view partly in elevation and partly in section taken substantially on broken line 6A—6A of Fig. 6 showing two blocking members.
Figure 11:
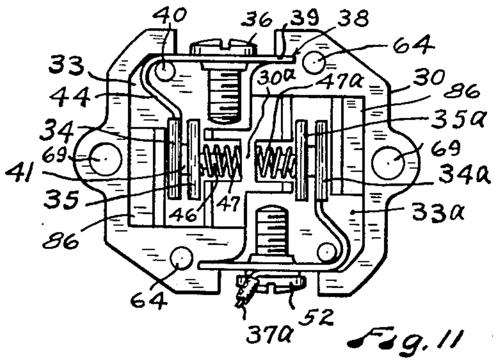
Fig. 11 is a front view of the back housing member with contact parts inserted.
Figure 9:
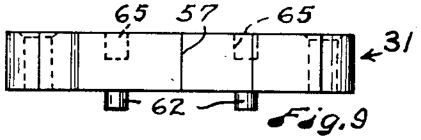
Fig. 9 is a top plan or edge view of the middle member of the housing.
Figure 9B:
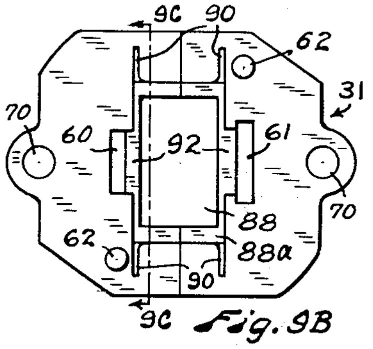
Fig. 9B is a front view of said middle member of the housing.
Figure 9C:
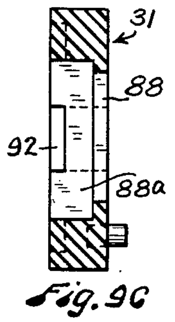
Fig. 9C is a view in vertical section on broken line 9C—9C of Fig. 9B.
Figure 12:
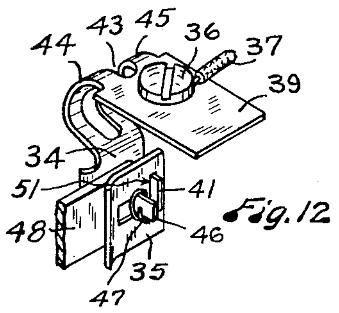
Fig. 12 is a detached view in perspective of the contactor members receiving a prong of the plug in connection with the housing.
Figure 10:
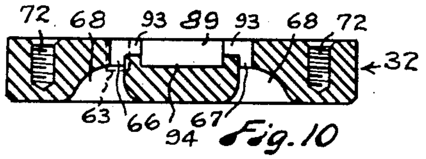
Fig. 10 is a view in plan or horizontal section of the third or front member of the housing (exposed to room)
Figure 15:
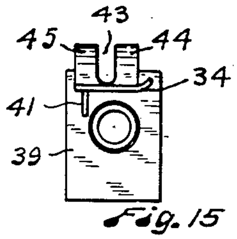
Fig. 15 is a view of said conductor in a plane at right angles to the plane of Fig. 14.
Figure 18:
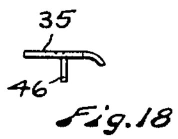
Fig. 18 is a view of said second conductor member in a plane 90° to that shown in Fig. 17.
Figure 17:
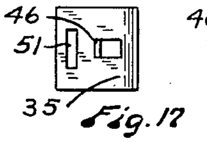
Fig. 17 is a view of said second conductor member in a plane at 90° to that shown in Fig. 16.
Figure 16:
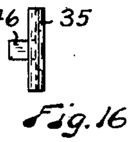
Fig. 16 is a front view of the second conductor member.
Figure 14:
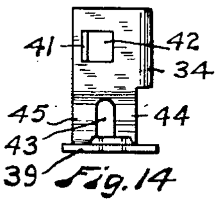
Fig. 14 is a view of one of the conductor members in a plane at right angles to that of Fig. 13.
Figure 13:
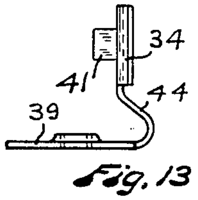
Fig. 13 is a detached front view of one of the conductor members.

The housing for the receptacle comprises three members: back member 30 (see Fig. 8), middle member 31 (see Fig. 9) and third (or room exposed) member 32 (see Fig. 10). Back member 30, the one next to the wall, has a recess 33 in which are located contact members 34 and 35 (see Figs. 11, 12, 13, 14, 15, 16, 17 and 18 for details). Contact member 34 has a screw member 36 which receives under its head a wire conductor 37 (Fig. 12). Contact member 34 is held in a recess 38 in the back housing member 30 as respects one end portion 39 and supported by a Bakelite knob 40 which knob is integrally formed with the housing member 30, thereby providing a recess between said knob and said member 30 which firmly mounts the contact member 34. Said contact members 34 and 35 may be of any electric conducting metal. Contact member 34 has a punched-out member 41 leaving an opening 42. Preferably a recess 43 is provided to make the adjoining parts 44 and 45 resilient. The second conductor or contactor member 35 has a punched-out member 46 which extends at right angles and provides a guide for a mounting spring 47 (see Fig. 11). The function of this spring 47 is to press conductor member 35 towards resiliently mounted contact member 34 thereby firmly gripping and making full contact with the prong 48 (see Fig. 12) of the plug 49 (see Fig. 3), said plug also having prong 50. Rectangular punched-out projecting member 41 of contact member 34 extends into a rectangular opening 51 of second contact member 35, thereby serving to mount conductor-contactor member 35 which is yieldingly held firmly against contactor member 34 by reason of the pressure of spring 47. Thus it is seen how the contact member 34 is mounted in the housing 30 and also how contact member 35 is in turn mounted on contact member 34.

Figure 2:
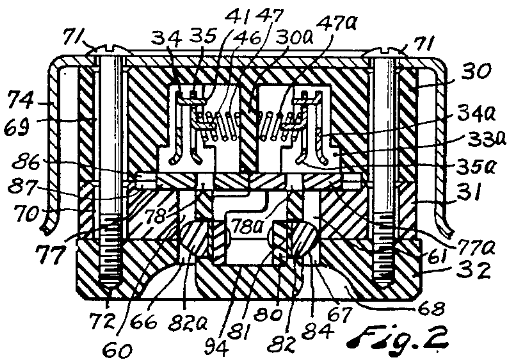
Fig. 2 is a view in horizontal section of the same taken substantially on broken line 2—2 of Fig. 1.
Figure 3:
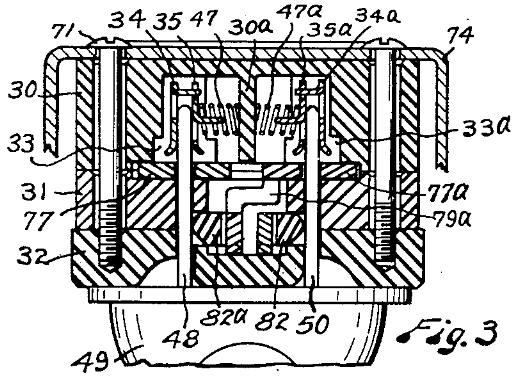
Fig. 3 is a view in horizontal section similar to Fig. 2 but with an electric plug inserted therein, the plug being shown in plan.
Figure 4:
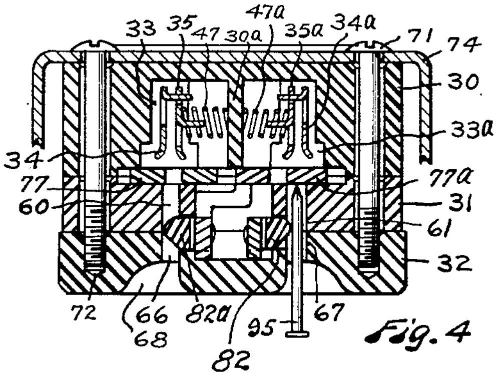
Fig. 4 is a view in horizontal section similar to Figs. 2 and 3 but with a foreign metallic object inserted, such as, for example, a nail.

Another pair of contact members 34*a* and 35*a*, Figs. 2, 3 and 4, are mounted in a recess 33*a* alongside of the recess 33. Contact member 35*a* has spring 47*a* urging it against contact member 34*a*. The construction, mounting and operation of contact members 34*a* and 35*a* are similar in all respects to contact members 34 and 35, and receive pronged member 50. Screw 52, Fig. 11, holds an electric conductor wire 37*a* so as to supply electrical energy to conductor member 34*a*. Springs 47 and 47*a* bear against a partition wall 30*a* in the housing member 30.

The middle member 31 of the housing (see Fig. 9A) has prong receiving openings 60 and 61 for the prongs 48 and 50 of plug 49 (see Fig. 3). Opening 61 is larger than opening 60 as it is customary to have one such opening larger than the other when direct current is used and the positive prong of the plug is inserted in said larger opening. However, in the case of alternating current, no difference is involved in the size of the prongs and therefore the receptacle is adapted for both direct and alternating current.

Figure 1:
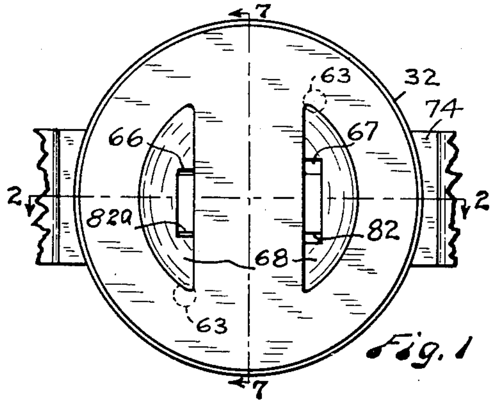
Figure 1 is a view in front elevation of the device involving my invention as it may appear with the plug removed

Preferably middle housing member 31 is made in two halves divisible along lines 57 to facilitate assembly. Also preferably dowel means is provided to insure correct position and registration of housing members 30, 31 and 32. This dowel means, as shown in Figs. 9, 9A, 9B, 9C, 10 and 11, comprises rigid pins 64 on back housing member 30 adapted to enter holes 65 in middle housing member 31 and other rigid pins 62 on middle housing member 31 adapted to enter other holes 63 in the rear side of front housing member 32, the holes 63 being shown by dotted lines in Figs. 1 and 10.

The front housing member 32 has two transversely spaced apart prong receiving openings 66 and 67 which correspond in size and position to the prong receiving openings 60 and 61 in the middle housing member 31 and register with said openings 60 and 61 when the several housing members are assembled. The outer face of the front housing member 32 has curved walls forming recesses 68 which converge toward the openings 66 and 67 and help to guide and properly position the prongs 48 and 50 on a plug 49 when the same is being plugged into the receptacle.

Figure 7:
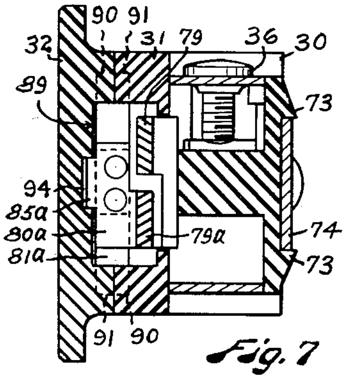
Fig. 7 is a view in vertical section taken substantially on line 7—7 of Fig. 1 through said device of my invention.

The back housing member 30 and middle housing member 31 are respectively provided, preferably adjacent opposite lateral sides thereof, with screw receiving holes 69 and 70 to receive screws 71. The front housing 32 is provided with internally threaded recesses 72 to receive the threaded ends of the screws 71. Preferably the rear side of the back housing 30 has two spaced apart horizontal ribs 73 (Figs. 7 and 8) between which a mounting bracket 74 of U or channel shape fits. The screws 71 also extend through the mounting bracket 74 and securely hold said bracket 74 and the housing parts 30, 31 and 32 in assembled relation. The housing members 30, 31 and 32 are all formed of electrical insulating material.

Figure 6B:
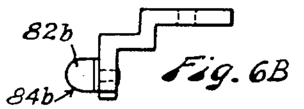
Fig. 6B is a detached plan view showing a blocking member of modified form.
Figure 6:
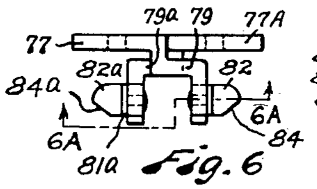
Fig. 6 is a detached top plan view of the blocking members shown in Fig. 5 showing them in relatively crossed operative position.
Figure 5:
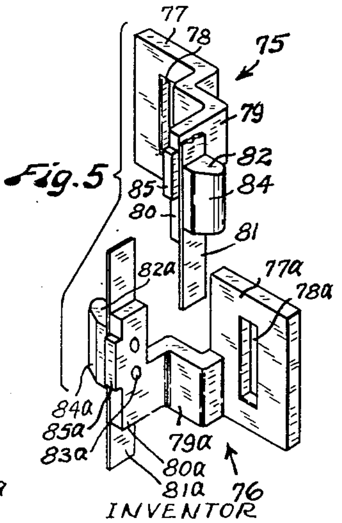
Fig. 5 is a detached exploded isometric view showing two blocking members of similar construction used to block off the prong inlet openings in an electrical receptacle, each blocking member having a blocking part and a trigger part.

In accordance with this invention two somewhat similar safety blocks or blocking members, which may also be termed locking members, indicated generally by numerals 75 and 76, Figs. 5 and 6, are provided for obstructing the prong receiving openings 60, 66 and 61, 67.

The safety block or blocking member 75, shown uppermost in Fig. 5 comprises a flat blocking plate 77 having therein an upright opening or slot 78 which is movable into and out of registration with the prong receiving openings 60, 66 in the housing. The blocking plate 77 has an integral Z-shaped arm 79 which terminates in a plate 80 to which a flat spring 81 and a safety block or trigger member 82 are secured by rivet means 83. Preferably the rivet means 83 is in the form of a U-shaped rivet member which has the closed end portion thereof embedded in the trigger member 82 at the time said trigger member is molded.

The flat spring 81 is held between the plate 80 and the trigger member 82. An inclined outer face 84 is provided on the trigger member 82. The parts 77, 79, 80 and 82 are all formed of insulating material. The plate 80 has a forwardly protruding extension or guide member 85. The width of the Z-shaped arm 79 from top to bottom thereof is preferably less than one half of the length of the blocking plate from top to bottom of said plate and said Z-shaped arm 79 is connected with the upper half of said plate, whereby it can extend across and will be clear of a corresponding arm 79*a* on the blocking member 76.

The said blocking member 76 comprises a blocking plate 77*a* with opening 78*a*, Z-shaped arm 79*a*, plate 80*a*, flat spring 81*a*, trigger member 82*a* with rivet 83*a* and inclined face 84*a*, and an extension or guide 85*a*, all of which correspond respectively to the previously described parts 77 to 85 of blocking member 75. Thus the structure of blocking member 76 is believed to be clear without further description.

The Z-shaped arm 79*a* of blocking member 76 is connected with the lower portion of plate 77*a* to offset it relative to the Z-shaped arm 79 of blocking member 75 so that these two Z-shaped arms can be relatively crossed. This allows the blocking plate of each blocking member to operate across one prong receiving slot and the trigger member of the same blocking member to operate in the other prong receiving slot.

The trigger member 82*b* shown in Fig. 6B is similar to trigger members 82 and 82*a* except that it has a front face 84*b* which is both inclined and curved or rounded as differentiated from the flat inclined faces 84 and 84*a*, previously described.

Figure 9A:
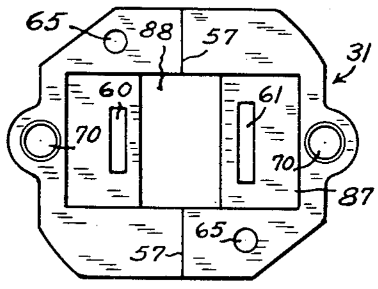
Fig. 9A is a rear view of said middle member of the housing.

The blocking plates 77 and 77*a* operate partly within a generally rectangular recess 86, Figs. 2, 3, 4 and 11, in the front face of the back housing member 30 and partly within a generally rectangular recess 87, see also Fig. 9A, in the back face of the middle housing member 31. The Z-shaped arms 79 and 79*a* operate in an opening 88 in the middle housing member 31. The plates 80 and 80*a* and the flat springs 81 and 81*a* operate partly in the opening 88 of middle housing member 31 and partly in a recess 89 in the back face of the front housing member 32. The upper and lower ends of the flat springs 81 and 81*a* are held within recesses 90, see Fig. 9B, in the middle housing member 31 and in corresponding recesses 91, see dotted lines Fig. 7, in the front housing member 32. The trigger members 82 and 82*a*, Figs. 2, 3, 4, 9B, 9C and 10, extend transversely and operate partly in notches 92 in the middle housing member 31 and partly in notches 93 in the front housing member 32. The extensions or guide members 85 and 85*a*, see Fig. 7, operate in a recess 94 in the front housing member 32. The inclined faces 84 and 84*a* of the trigger members 82 and 82*a* are outwardly directed and the springs 81 and 81*a* yieldingly urge the trigger members into the prong outlet openings 60, 66 and 61, 67 as shown in Fig. 2.

In use this electrical receptacle functions in the same manner as an ordinary wall socket in receiving a two pronged plug 49, Fig. 3. When no plug prongs are in the receptacle, see Fig. 2, the blocking plates 77 and 77*a* are held in blocking position as respects the prong receiving openings and the trigger members 82 and 82a are held within the prong receiving openings by the flat springs 81 and 81a. When the prongs 48 and 50, Fig. 3, are inserted in the prong receiving openings the ends of said prongs contact the inclined faces 84 and 84a of the trigger members 82 and 82a and move said trigger members and the blocking plates 77 and 77a into the positions shown in Fig. 3 so that the prongs 48 and 50 may pass through the openings 78 and 78a in said blocking plates. The prong 50 moves the blocking plate 77 out of the way of the prong 48 and the prong 48 moves the other blocking plate 77a out of the way of the prong 50. Thus both prong receiving openings are cleared for the entrance of the two prongs 48 and 50.

If no plug is in the receptacle and an object, such as the nail 95 shown in Fig. 4, is inserted in one prong receiving opening, such as the prong receiving opening 61—67, then the blocking plate 77 will be aligned with the other prong receiving opening but the blocking plate 77a will not be moved and will block insertion of the nail 95 far enough to reach the contact members 34a and 35a. Thus a child playing with a hair pin or nail or piece of wire is unable to bring it into contact with the contact members in the receptacle.

The contact members 34 and 35 and 34a and 35a are set far enough back from the front of the receptacle so that if a child hooks one or more fingers over the prong side of the plug and then inserts the same, the thickness of the fingers will prevent the child from bringing the prongs 48 and 50 into engagement with the contact members.

The contact members 34, 35 and 34a, 35a grip the prongs 48 and 50 firmly insuring good contact and preventing the plug from being too easily withdrawn. The trigger members 82 and 82a also frictionally engage the prongs 48 and 50 and provide desirable additional resistance to easy withdrawal of the plug.

Obviously changes may be made in the form, dimensions and arrangement of parts of this invention, without departing from the principle thereof, the above setting forth only preferred forms of embodiment.

I claim:

1. A safety electrical receptacle comprising a single receptacle mounting housing having prong openings for the reception of the prongs of a standard electrical plug; electrical contact members disposed in the prong openings; locking members one each for said prong openings separately slidably mounted in said housing having a trigger end portion and a prong opening locking end portion, the underside of which is in longitudinally spaced relation to said contact members, the middle portion of said members being disposed in side by side relation in extending between said prong openings, the trigger portion of each being disposable in a blocking position in a prong opening and the locking end portion simultaneously extending entirely across the oppositely disposed prong opening when said trigger is in blocking position in a prong opening in making it necessary for each prong of a plug to be simultaneously inserted to unlock the prong opening for the other prong when applied to a receptacle before said prongs can engage the said electrical contact members; and a flat spring for each locking member, each of said springs separately engaging its respective locking member, and each of said springs being fixedly held as to one of its end portions in said housing in urging the trigger member of its engaged locking member normally into blocking position in one prong opening, said locking members moving away from each other against said spring action in being actuated into unblocking position, and simultaneously the locking end portion of said locking member in locking position in the opposite prong opening, and each spring cooperating in mounting its locking member.

2. A safety electrical receptacle comprising a single receptacle mounting housing having two spaced apart prong receiving openings therein for the reception of the prongs of a standard electrical plug; two blocking members slidably simultaneously movable in regular operation in one plane and disposed in said mounting housing with parts thereof in relatively crossed and sliding relation, each blocking member having a blocking part movable entirely across one prong receiving opening and a trigger part positioned to extend into the other prong receiving opening and controlling the movement of the blocking part; a flat spring for each locking member positively and independently guidingly mounting said member in operative position; and electrical contact members positioned in said prong receiving openings back of said blocking members.

3. A safety electrical receptacle comprising a single receptacle mounting housing having two spaced apart prong receiving openings therein for the reception of the prongs of a standard electrical plug; electrical contact members positioned in said prong receiving openings; a locking member disposed in said housing for each prong opening, each locking member having a locking end portion and an adjacent slot for the reception of a prong of an electrical plug in one of said prong openings and a trigger portion in the opposite end of said locking member, said trigger end portion being removably disposed to extend into the other prong opening, the underside of the locking end portion of each locking member being in spaced relation to its respective electrical contact member, the trigger end portions of the locking members being in one transverse plane and the locking end portions of the locking end members being in a second transverse plane in spaced relation to said trigger plane, the middle portion of each trigger member being offset to provide for the said separation of the said transverse planes in providing for compactness and freedom of movement of said locking members, the trigger end portions and the locking end portions of said locking members being oppositely disposed in their respective planes; and a flat spring having its end portions disposed in the opposite walls of said housing and having its middle portion secured to the trigger end portion of each said locking members in mounting said locking members in said housing.

4. A safety electrical receptacle comprising a single receptacle mounting housing having prong openings extending therein for the reception of the prongs of a standard electrical plug; electrical contact members disposed in the prong openings; a locking member separately movably mounted transversely of each prong opening, each locking member having a trigger end and a locking end portion extending across the prong opening opposite the prong opening in which the trigger end of that member is located, the underside of which locking end portion is in longitudinally spaced relation to its respective prong opening, the middle part between said trigger and said locking end portion being of a Z-like form providing for compact interfitting relation and for each locking end portion sliding in the same transverse plane, each locking end portion having a prong passing slot for the prong opening over which it extends in requiring each prong of a plug to be simultaneously inserted to unlock the prong opening for the other prong of a plug when applied to said receptacle by moving the said slot by displacement of its trigger end portion into registration with the said prong opening in permitting the prongs of an electrical plug to engage said electrical contact members.

5. A safety electrical receptacle comprising a single receptacle mounting housing having prong openings disposed in parallel relation therein for the reception of the prongs of a standard electrical plug; electrical contact members disposed in the end portions of said prong openings; locking members separately movably mounted adjacent said prong openings in spaced relation to said contact members longitudinally considered, each member having a trigger end and a locking end portion, the middle part between said trigger and said locking end portion lying in different planes providing faces disposed side by side in the locking end portion extending between said prong openings in which there is a prong passing slot, the trigger portion of each being disposable in blocking position in a prong opening in spaced relation to said contact members longitudinally of said opening, and the locking end portion simultaneously extending across the oppositely disposed prong opening in requiring each prong of a plug to be simultaneously inserted to unlock the prong opening for the other prong of a plug, when applied to said receptacle by moving the said slot into registration with said prong opening in permitting the prong of an electrical plug to engage said electrical contact members; and a flat spring for each locking member, each of said springs separately engaging its respective locking member and each of said springs being fixedly held as to one of its end portions in said housing in urging its trigger member normally into blocking position in one prong opening and simultaneously the locking end portion in locking position in the opposite prong opening, and each spring cooperating in mounting its locking member.

6. A safety electrical receptacle comprising a single receptacle mounting housing having an inwardly extending partition having substantially extended prong openings disposed in parallel relation therein for the reception of the prongs of a standard electrical plug; electrical contact mechanism for each prong opening, each mechanism comprising an electrical contact member resiliently mounted in said housing and having a projection on which is slidably mounted a companion inwardly located contact member having a bearing for mounting and guiding one end of a spring which has its opposite end disposed against said partition of said housing, said disposition of said spring against said partition of each mechanism being in substantial alignment in mutually supporting said partition; locking members separately movably mounted adjacent said prong openings in spaced relation to said contact members longitudinally considered, each member having a trigger end and a locking end portion for fully locking the prong opening, and also a prong passing slot, the middle part between said trigger and said locking end portion being of Z form providing faces for said locking members disposed side by side, said middle portion extending between said prong openings, the trigger portion of each being disposable in blocking position in a prong opening in spaced relation to said contact members longitudinally of said opening, and the locking end portion simultaneously extending fully across the oppositely disposed prong opening in requiring each prong of a plug to be simultaneously inserted to unlock the prong opening for the other prong of a plug, when applied to said receptacle, by moving the said slot into registration with said prong opening in permitting the prongs of an electrical plug to engage said electrical contact members, and said prongs of an electrical plug being firmly held in said receptacle by said trigger member and said electrical contact mechanism.

7. A safety electrical receptacle comprising in superimposed position, a back base member, a middle member having prong openings for the reception of the prongs of a standard electrical plug, and a face member having prong openings registering with said prong openings of said middle member, said back base member mounting an electrical insulating partition extending medially inwardly of said receptacle and having oppositely disposed spring mounting recesses, said base member also mounting an electrical contact member on each side of said partition, each of which has a projection on which is slidably mounted a companion inwardly located contact member having a bearing for mounting and guiding one end of a spring which has its opposite end disposed in one of the said spring mounting recesses; said middle member forming with said base member a centrally transversely disposed shallow recess, said middle member also having an axially disposed mounting opening extending entirely through said middle member in which are mounted a pair of locking members, each of said locking members having intermediate interfitting faces, said members being separately movable with respect to each other and having on one end portion a trigger member normally resiliently held in blocking position in a prong opening and on the other end a solid locking end portion together with an adjacent slot, said locking end portion being slidably disposed in said shallow recess and extending across the other prong opening normally simultaneously when the trigger is in blocking relation in the opposite prong opening, and when said trigger member is pressed back in unblocking the prong opening adjacent which it is mounted, the slot of the locking end portion of said locking member is caused to register with the other prong opening; and screws securing together said base, middle, and face members.

8. In a safety electrical receptacle, a locking mechanism comprising a single receptacle mounting housing having prong openings and a locking member for each of said prong openings, each locking member having a trigger end portion and a prong opening locking end portion, the middle portion of said members extending between the said prong openings, each locking member being resiliently mounted on the housing by a flat spring, each end of which is mounted in the housing and the middle portion of which is secured to one of said locking members and resiliently mounting said member for transverse movement in a definite plane transverse of said prong opening, said mounting maintaining the trigger portion in blocking position in one prong opening while the locking end portion of said locking member extends across another prong opening in locking position in providing for operation of the locking members crosswise of said prong openings.

9. A safety electrical receptacle comprising a receptacle for receiving the prongs of an electrical plug, said receptacle having a mounting housing and prong openings extending therein for the reception of prongs of an electrical plug; electrical contact members disposed in the prong openings; a locking member for each prong opening slidably movably mounted, each member having a trigger and a locking end portion, the underside of which locking end portion is in longitudinally spaced relation to its respective contact member, the middle part of each locking member being offset in providing for compact interfitting relation and permitting each locking end portion to slidably move in the same transverse plane, each locking end portion having a prong passing slot for the prong opening over which it extends, in requiring each prong of a plug to be simultaneously inserted to unlock the prong openings for the other prong of a plug when applied to said receptacle by moving the said slot by displacement of its trigger end portion into registration with the said prong opening in permitting the prongs of an electrical plug to simultaneously engage said electrical contact members; and a flat spring bearing against each locking member for positively and independently guidingly mounting said member in operative position.

10. A safety electrical receptacle comprising a receptacle mounting housing having prong openings for the reception of the prongs of a standard electrical plug; electrical contact members disposed in the prong openings; two (2) springs with an end portion of each mounted in said housing; a locking member secured to each of said springs transversely thereof, one locking member for each prong openings said locking members being separately slidably mounted in said housing having a trigger end portion disposed in and between the prong openings and a prong opening locking end portion, the underside of which is longitudinally in space relation to said contact members, the middle portion of said members being disposed in side by side relation in extending between said prong openings, the trigger portion of each being disposable in a blocking position in a prong opening and movable toward each other in being actuated to an unlocking position and the locking end portion simultaneously extending entirely across the oppositely disposed prong opening when said trigger is in blocking position in a prong opening, thus making it necessary for each prong of a plug to be simultaneously inserted to unlock the prong opening for the other prong when applied to a receptacle before said prongs can engage the said electrical contact members.

References Cited in the file of this patent

UNITED STATES PATENTS

| | | |
|---|---|---|
| 2,155,925 | Blinn | Apr. 25, 1939 |
| 2,477,803 | Huber | Aug. 2, 1949 |
| 2,545,536 | Von Holtz | Mar. 20, 1951 |
| 2,579,538 | Bierce | Dec. 25, 1951 |

FOREIGN PATENTS

| | | |
|---|---|---|
| 508,415 | Great Britain | June 30, 1939 |
| 508,248 | Great Britain | June 28, 1939 |
| 239,441 | Switzerland | Oct. 15, 1945 |